United States Patent Office 2,815,329
Patented Dec. 3, 1957

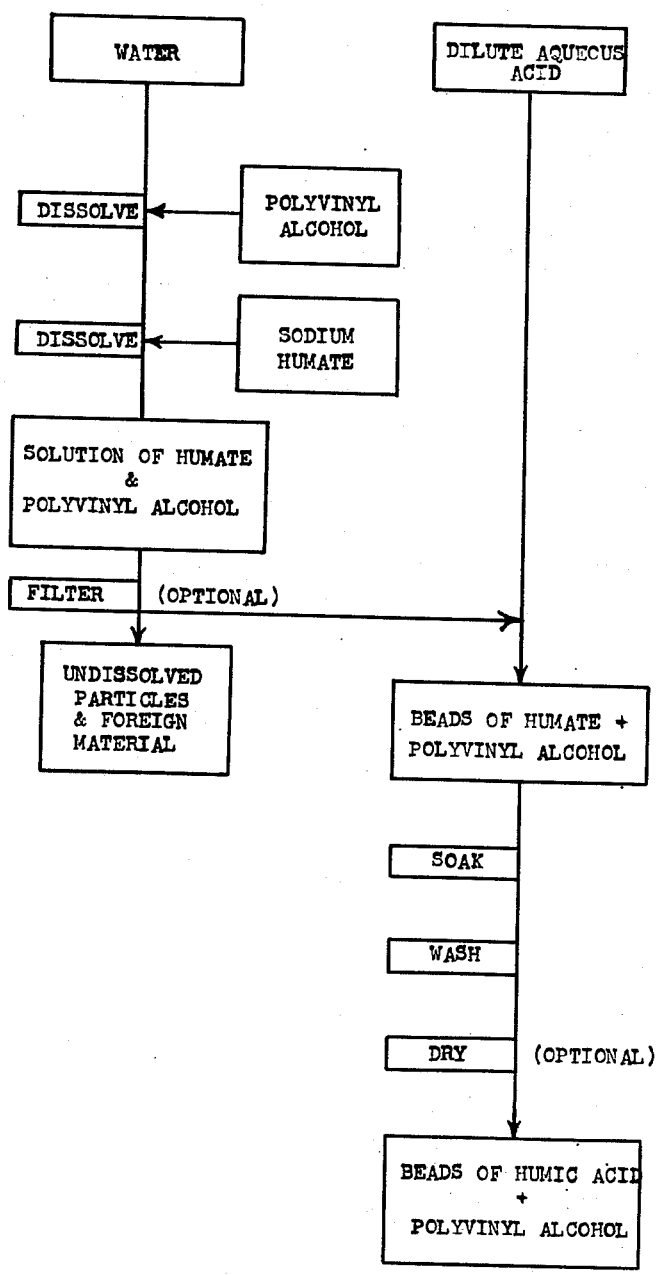

2,815,329

PROCESS FOR PREPARING HUMIC ACID BEADS AND PRODUCT

Leo M. Germain, Shawinigan Falls, Quebec, Canada, assignor to Shawinigan Chemicals Limited, Montreal, Quebec, Canada, a corporation of Canada Application October 14, 1955, Serial No. 540,578

6 Claims. (Cl. 252—179)

This invention relates to a method for the preparation of granular humic acid, in particular in the form of round granules or beads of approximately uniform size suitable for metal cation exchange purposes. Humic acid is the term applied to various acidic constituents of black spongy semi-colloidal matter (humus) present in soils, peat, and other similar materials. Humic acids are derived from the decomposition products of lignin formed by the slow oxidation of the latter. Processes for the preparation of humic acid are described by Thiessen and Engelder, "Isolation of Humic Acids," Industrial and Engineering Chemistry, 22:1131 (1930), and by Esh and Guka-Sircar, J. Indian Chem. Soc., 17:326–31 (1939).

Humic acid has always been obtained as extremely finely divided material which, in aqueous medium, forms colloidal or semi-colloidal particles difficult to handle and most awkward to work with. It is an object of this invention to provide a process for the preparation of humic acid in granular form, particularly in the form of round beads of approximately uniform size which can be handled easily and used directly in specific applications utilizing humic acid.

Humic acid forms water insoluble complexes with most metallic ions except the alkali metals, with which it forms water soluble salts. After its extraction from the source material, humic acid is usually prepared as a precipitate by adding an alkaline aqueous solution of sodium, potassium, or ammonium humate to an aqueous solution of a mineral acid. The precipitates are finely divided and somewhat colloidal in nature.

It has now been found that humic acid can be prepared in granular form by a process comprising (a) preparing an aqueous solution containing polyvinyl alcohol and a humate of the group consisting of sodium humate, potassium humate, and ammonium humate, (b) adding the said solution dropwise to a dilute aqueous solution of mineral acid whereby discrete gelled beads of humate, containing polyvinyl alcohol, are formed which do not adhere to each other, (c) soaking the gelled beads in the acid solution whereby the humate is converted to humic acid, and salt is formed, and (d) washing the beads until essentially free of the salt formed in the preceding steps. It is preferable to filter the solution of humate and polyvinyl alcohol to remove any undissolved particles or foreign materials before adding it to the acid solution. If desired the washed beads may be dried, preferably at a temperature between 50° and 70° C. During drying a slight shrinkage of the beads occurs.

The accompanying drawing is a flow sheet illustrating the process of this invention including the optional steps of filtering and drying.

The polyvinyl alcohol used may contain some residual vinyl ester groups but is preferably hydrolyzed over about 99%. The proportion of polyvinyl alcohol for forming the beads can vary over a range of approximately 5% to 35% by weight of the humate. It is preferred to use high viscosity polyvinyl alcohol, the 4% aqueous solution of which has a viscosity at 20° C. of 40 to 55 centipoises. Such polyvinyl alcohol can be used to the extent of 5% to 20% by weight of the humate, the preferred range being from 9% to 20%. There can also be used polyvinyl alcohol of lower viscosity, the 4% aqueous solution of which has a viscosity at 20° C. of 18 to 20 centipoises, for example. Such polyvinyl alcohol can be used to the extent of 11% to 25% by weight of the humate, the preferred range being from 17% to 25%. Polyvinyl alcohols of still lower viscosity can likewise be used but the resultant beads are undesirably weak. Larger proportions of polyvinyl alcohol may of course be used; the resultant beads are mechanically stronger but have lower ion exchange capacities. The proportions of polyvinyl alcohol and humic acid in the beads are about the same as the proportions of polyvinyl alcohol and humate in the solution used in forming the beads; i. e. the beads contain from 5% to 35% polyvinyl alcohol by weight of the humic acid therein.

The solutions for forming the beads can range from 8% to 14% by weight of solids (humate plus polyvinyl alcohol), the preferred range being from 10% to 12%. Solutions containing over 14% solids are undesirable for forming beads because their higher viscosities impede the formation of the desired rounded beads; solutions containing below 8% solids form beads which have an undesirably weak structure.

Examples of the mineral acid for coagulating the beads are sulphuric, hydrochloric, and nitric acids. The acid concentration is not critical; 1 to 2% by weight is suitable. If a large quantity of beads is being made, care must be taken that the acid concentration does not fall too low by reaction with the humate solution.

Beads of humic acid and polyvinyl alcohol, made by this process, are insoluble, before or after drying, in water and dilute aqueous acid or alkaline solutions even when heated, though they swell slightly in water or such solutions. They are able to absorb metal cations from aqueous solutions. The insolubility in dilute alkaline aqueous solution is unexpected in view of the independent solubility of both of the original materials.

The following example illustrates the preparation of humic acid beads.

A solution was prepared from 150 grams of water, 5 grams of polyvinyl alcohol (medium viscosity, 99% hydrolyzed) and 15 grams of sodium humate (extracted from peat). The polyvinyl alcohol was dissolved in the water first, and while the solution was hot the sodium humate was added and dissolved therein. The solution was then filtered, while still hot, through a fine cloth to remove undissolved material, and cooled to room temperature. Beads were then formed by adding the humate solution dropwise to about 2 liters of aqueous hydrochloric acid solution, about 1.5% by weight. Dropwise addition was achieved by running the humate solution through a number of small tubes connected in parallel to a reservoir of the humate solution mounted above the acid solution. The humate solution ran out of the reservoir under the influence of gravity through the small tubes which were restricted to permit only a slow flow of solution so that the latter flowed dropwise out the bottom ends of the tubes and fell into the acid solution below. When the drops of humate solution entered the acid solution they immediately gelled so that the individual drops retained their rounded shape as they settled through the acid solution to the bottom thereof. After all the humate solution had been added to the acid solution and converted to gelled beads, the beads were soaked for about 3½ hours in the acid and then washed with fresh water until they were substantially free of chloride ion. The beads were then dried in a tray drier at 50–70° C. for 12 hours. During the drying period the beads shrank somewhat and hardened to uniform dark colored granules that could be stored indefinitely. On soaking in water the granules swelled, and after an hour they possessed the full cation absorbing power of the original humic acid.

The following examples illustrate the use of the beads of humic acid as a cation exchange material.

35 grams of powdered humic acid were packed in a glass column 13 mm. in diameter and 35 cm. long. An aqueous solution of mercurous sulfate containing 0.04% mercury was passed through the bed of humic acid. The maximum convenient rate at which the solution could be forced through the humic acid without deranging the bed was about 250 cc. per hour. At this rate, the effluent contained less than 0.005% mercury (the minimum amount detectable by the thiocyanate analytical method). This constituted over 98.6% removal of the mercury from the solution. The cation exchange capacity of the bed was found to be over 0.002 mol. (2-milli-equivalents) per gram of humic acid, i. e. the humic acid could adsorb about 40% of its own weight of mercury from the aqueous solution.

In a similar experiment 90 grams (dry weight) of humic acid beads 1 to 1½ mm. diameter, prepared as described above, were soaked in distilled water to swell them, then packed in a glass column 26 mm. diameter and 46 cm. long. Mercurous sulfate solution containing 0.04% mercury could be passed through the bed of beads at a wide range of rates, up to somewhat more than 1200 cc. per hour, maintaining more than 98.6% adsorption of the mercury. Flow rates of over 3000 cc. per hour could be maintained through the bed of beads without deranging it; however at the higher flow rates the adsorption of mercury was not as nearly complete, being about 75% at flow rates around 3000 cc. per hour. Even with the high flow rates, there was no undesirable channeling through the bed of beads, whereas through the bed of humic acid powder, channeling was always present. Thus the use of humic acid beads instead of powder for cation exchange beds has permitted the use of faster flow rates and has eliminated channeling in the beds without decreasing the adsorptive power of the humic acid.

What is claimed is:

1. A process for the preparation of humic acid in granular form comprising (a) preparing an aqueous solution containing polyvinyl alcohol and a humate of the group consisting of sodium humate, potassium humate, and ammonium humate, the polyvinyl alcohol comprising between 5% and 35% by weight of the humate (b) adding the said solution dropwise to a dilute aqueous solution of strong mineral acid selected from the group consisting of hydrochloric acid, nitric acid and sulphuric acid, whereby discrete gelled beads of humate and polyvinyl alcohol are formed which do not adhere to each other, (c) soaking the gelled beads in the acid solution whereby the humate is converted to humic acid, and a salt is formed, and (d) washing the beads until essentially free of the salt formed in the preceding steps.

2. A process as claimed in claim 1 including the additional step of filtering the solution of humate and polyvinyl alcohol before adding the said solution to the mineral acid.

3. A process as claimed in claim 1 including the additional step of drying the washed beads at a temperature between 50° and 70° C.

4. A process as claimed in claim 1, in which the sum of the concentrations of polyvinyl alcohol and humate in the solution for forming the beads is from 8% to 14% by weight of the solution.

5. A process as claimed in claim 1, in which the solution of acid has an acid concentration of between 1% and 2% by weight.

6. A composition of matter in the form of approximately rounded beads for ion exchange purposes consisting of humic acid and 5% to 35% by weight of the humic acid of polyvinyl alcohol.

References Cited in the file of this patent
UNITED STATES PATENTS

| 1,426,638 | Hepburn | Aug. 22, 1922 |
| 1,739,566 | Ali-Cohen | Dec. 17, 1929 |
| 2,265,585 | Urbain et al. | Dec. 9, 1941 |
| 2,652,379 | Hedrick et al. | Sept. 15, 1953 |